March 12, 1974     C. HOLBOLL     3,796,737
METHOD FOR PROCESSING ANIMAL RAW MATERIAL
Filed Feb. 17, 1971
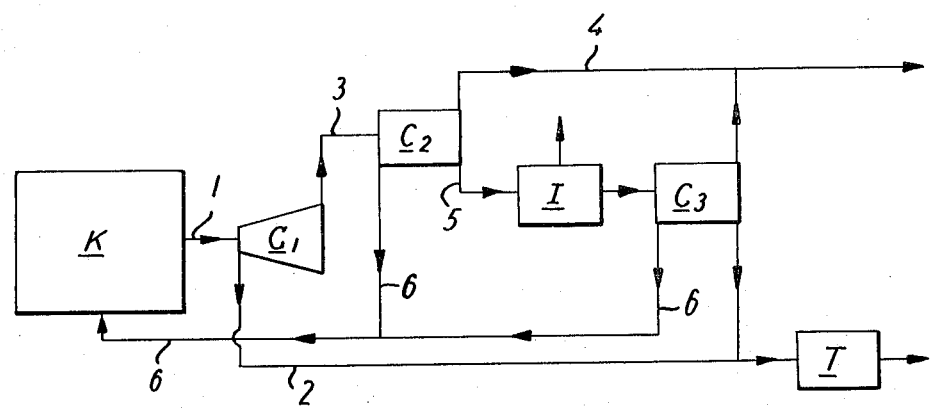
INVENTOR
CHRISTEN HOLBØLL
BY    Beveridge + DeGrandi
ATTORNEY United States Patent Office 3,796,737
Patented Mar. 12, 1974

3,796,737
METHOD FOR PROCESSING ANIMAL RAW MATERIAL
Christen Holboll, Klampenborg, Denmark, assignor to Titan Separator A/S, Soborg, Denmark
Filed Feb. 17, 1971, Ser. No. 116,130
Claims priority, application Denmark, Feb. 24, 1970, 918/70
Int. Cl. C11b 1/12
U.S. Cl. 260—412.6                2 Claims

ABSTRACT OF THE DISCLOSURE

For the purpose of reducing the amount of fat in the dry product obtained from raw animal material that is subjected to boiling and is separated, in one or more stages, in pure fat, glue water, and sludge, the sludge is returned to the boiler for renewed heat treatment together with raw material not yet boiled.

---

In the processing of animal raw material, e.g. dead beasts or offal from slaughterhouses, to extract fat and dry matter or solids separately it is, for example from the specification of DAS 1,216,667, known to coarse-chop the raw material and to heat it for about 30 minutes in a boiler, after which the material is cooled so that the vapors are condensed. The mass is next in a separator separated into wet solids and a mixture of fat and glue water, and this mixture is in another separator separated into fat and glue. Finally, the glue water is mixed with the solids or some other rather dry material, such as bones disintegrated by boiling, before the whole is dried in a suitable drying apparatus. The separation into fat and glue water can only be carried out to a limited extent, and consequently a quantity of undesirable fat will be added to the solids together with the glue.

In practice it is often required that the fat content in the ready dry product does not exceed a certain limit, for example 8%. This requirement may not be fulfilled solely by proceeding in accordance with the known method mentioned above, and in order to achieve a reduction in the fat content of the final product it has therefore been suggested to return part of the glue water extracted to a preceding stage of the process for renewed treatment with a view to reducing the content of the fat bound therein. If the glue water is returned to the boiler, which in itself is the most effective, the return causes an increased load on the boiler to the detriment of the economy of the operation. If instead the glue water is returned to a stage after the boiler, this entails the inconvenience that the glue accumulates particles of sludge and thereby gradually obtains a so high viscosity that it becomes difficult or impossible to carry out the method.

Based on these considerations it has furthermore been suggested to divide the returned quantity of glue water into two batches, one of which is supplied to the boiler, while the other is supplied to a later stage of the process. By this means, the effect aimed at, viz. a reduction of the fat content in the glue water will only be achieved to a lower degree.

For similar purposes it has been suggested to return sludge, which is separated off in the separator for the separation of fat and glue water, to the first separator, i.e. the separator for separating the newly-boiled mass into aqueous solids and a mixture of fat and glue. The purpose of this return of sludge is to remove as much as possible of the fat contained therein by the renewed treatment of the sludge. In practice it turns out, however, that the results are not satisfactory in this respect, and this must be due to the fact that the fat is strongly bound to the small particles or fines of the sludge and this connection is only to a slight degree broken by the renewed treatment.

Another possibility of reducing the fat content in the sludge, before the final drying is effected, consists in controlling the discharge of sludge from the fat separator very accurately, either in the way that the quantity of fat is drained off first and before the bowl is emptied of its sludge and remaining contents, or so that the bowl is closed immediately after the discharge of the sludge that is poor in fat and is concentrated outermost in the bowl, before the material in the bowl containing more fat arrives at the discharge opening of the bowl. A utilization of these possibilities will, however, require the utmost care as regards the control of the emptying of the separator bowl, and the possibilities may therefore be regarded as impossible to carry out in practice with the sufficient safety and precision.

Based on the prior art technique mentioned above, the invention relates to a method for processing animal raw material, e.g. carcases or offal from slaughterhouses, for extracting fat and dry matter or solids, comprising the steps of feeding the raw material from a boiler to a separator for being separated into a first fraction consisting substantially of wet solids and a second fraction consisting substantially of water and fat together with-dissolved solids, the second fraction being subjected to a treatment in one or more separators for the separation of fat and, possibly after a partial evaporation and a further fat-extracting separation, being fed to a drying apparatus for the extraction of the solids incorporated in the glue water of this fraction.

With a view to reducing the fat content in the finished dry product, the method according to the invention is characterized in that the sludge from the fat separator or from at least one of the fat separators is returned to the boiler for a renewed treatment together with fresh raw material.

It has surprisingly turned out that a return of the sludge from the separator to the boiler reduces the fat content in the finished produce to 6–9%, while in the case of an otherwise analogous method, but without return of sludge to the boiler, it is normally not possible to get down below a fat content of 10–12%.

As mentioned above, the fat content in the sludge from the separator is bounded strongly to the small solid particles or fines in the sludge, and this is due to the fact that the fat forms a film or a surface layer on the individual particles and may therefore only to a slight degree be separated from the latter by a renewed separation. When, however, the sludge from the separator is returned to the boiler and in the latter is mixed with fresh raw material, the protein in the said raw material will cause an agglomeration or cementing together of the coagulated sludge particles, so that the power of the said particles of retaining the fat is reduced considerably. This in turn means that a separation with a view to separating off the fat can be carried out with a good result, and that consequently an essential part of the fat content in the separator sludge is by the renewed treatment in the fractioning separator removed together with the greater part of the fat in the freshly supplied raw material.

At the same time it is worth noting that the supply of sludge to the boiler will only cause a slight additional load on the latter, since the quantity of sludge returned will be very small as compared with the quantity of raw material, e.g. of the order of magnitude of 5% of the latter.

The invention will now be more fully explained with reference to the accompany drawing which is purely diagrammatical.

In the drawing, K designates a boiler, which may for example be an ordinary, steam-heated dry melter with a supply hatch, not shown, and a discharge opening which through a pipe 1 is connected to a separator $C_1$ for fractioning the sterile mashed material, more or less disintegrated by boiling, into a first fraction, which consists substantially of solids with a slight water content, and a second fraction which consists of water, liquid fat and water-dissolved solids. The first fraction is through a pipe 2 fed to a drying apparatus T, while the second fraction is discharged from the fractioning separator $C_1$ through a pipe 3 to a fat separator $C_2$. From this separator, pure fat is discharged through a pipe 4, while glue water with a certain fat content is discharged through a pipe 5 to an evaporator I and from this further on to an additional fat separator $C_3$. The discharge opening for separated fat of the said separator $C_3$ is connected with the pipe 4, while its discharge opening for concentrated glue water is connected with the pipe 2 which leads to the drying apparatus T.

Each of the separators $C_2$ and $C_3$ is furthermore provided with a sludge discharge opening which through a pipe 6 is connected to the boiler K for return of the sludge from the separator. Thus, the sludge is in the boiler mixed with freshly supplied raw material with the effect mentioned above, viz. that the total fat content in the final product from the drying apparatus T can be reduced substantially.

What is claimed is:

1. A method for the processing of animal raw material for obtaining fat and dry matter separately, comprising the steps of
   (a) heating said raw material in a boiler to a temperature above the melting point of the fat incorporated in said raw material;
   (b) discharging the heated raw material from the boiler into a fat separator, and, thereby, separating the heated material into two fractions, a first fraction consisting substantially of wet solids, and a second fraction consisting substantially of water, liquid fat and water-dissolved solids;
   (c) discharging said second fraction into another fat separator, thereby subjecting said second fraction to at least one sparation, separating a further quantity of pure fat from water with dissolved matter, and sludge; and
   (d) discharging at least a substantial part of said sludge, together with fresh raw animal material, into said boiler for renewed heat treatment according to step (a).

2. A method as claimed in claim 1, which further comprises discharging into an evaporator the water portion of said second fraction of step (b) and concentrating said water portion; discharging said concentrated second fraction into a fat separator which separates a quantity of pure fat from sludge; discharging the sludge from said fat separator together with fresh raw material into said boiler for renewed heat treatment according to step (a).

References Cited
UNITED STATES PATENTS

| | | | |
|---|---|---|---|
| 2,823,214 | 2/1958 | Sharples | 260—412.6 |
| 2,911,421 | 11/1959 | Greenfield | 260—412.6 |
| 3,158,634 | 11/1964 | Marsh | 260—412.6 |

JOHNNIE R. BROWN, Primary Examiner